(12) United States Patent
Glaser

(10) Patent No.: US 6,446,097 B1
(45) Date of Patent: *Sep. 3, 2002

(54) HTML INTEGRATION UTILITY FOR A PROGRAM DEVELOPMENT ENVIRONMENT

(75) Inventor: Howard Justin Glaser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/361,721

(22) Filed: Jul. 27, 1999

Related U.S. Application Data

(63) Continuation of application No. 08/828,890, filed on Mar. 31, 1997, now Pat. No. 5,953,731.

(51) Int. Cl.[7] ................................ G06F 17/21
(52) U.S. Cl. ................ 707/513; 707/530; 707/500.1
(58) Field of Search ................ 707/513, 531, 707/530, 500.1, 508, 514

(56) References Cited

U.S. PATENT DOCUMENTS

| | | | |
|---|---|---|---|
| 5,168,441 A | 12/1992 | Onarheim et al. | 364/146 |
| 5,179,698 A | 1/1993 | Bachman et al. | 395/600 |
| 5,193,182 A | 3/1993 | Bachman et al. | 395/600 |
| 5,193,183 A | 3/1993 | Bachman | 395/600 |
| 5,195,178 A | 3/1993 | Krieger et al. | 395/157 |
| 5,241,645 A | 8/1993 | Cimral et al. | 395/500 |
| 5,249,300 A | 9/1993 | Bachman et al. | 395/800 |
| 5,694,561 A | * 12/1997 | Malamud et al. | 345/805 |
| 6,216,141 B1 | * 4/2001 | Straub et al. | 707/513 |

* cited by examiner

Primary Examiner—Stephen S. Hong
Assistant Examiner—Grant C Yang
(74) Attorney, Agent, or Firm—Gates & Cooper LLP

(57) ABSTRACT

A method, apparatus, and article of manufacture for providing a programming development environment that supports the development of Internet and Intranet applications. A utility allows visual selection and/or manipulation of HTML pages or forms. A user may select control from one form or HTML page and insert it into another HTML page. This results in the applet code associated with the selected control being inserted into the code for the HTML page being displayed in a code editor window or form editor window. The development computer also performs a dependency check for other codes and/or controls upon which the inserted applet depends and issues warnings or performs automatic inclusion of the dependency code and/or control.

18 Claims, 13 Drawing Sheets

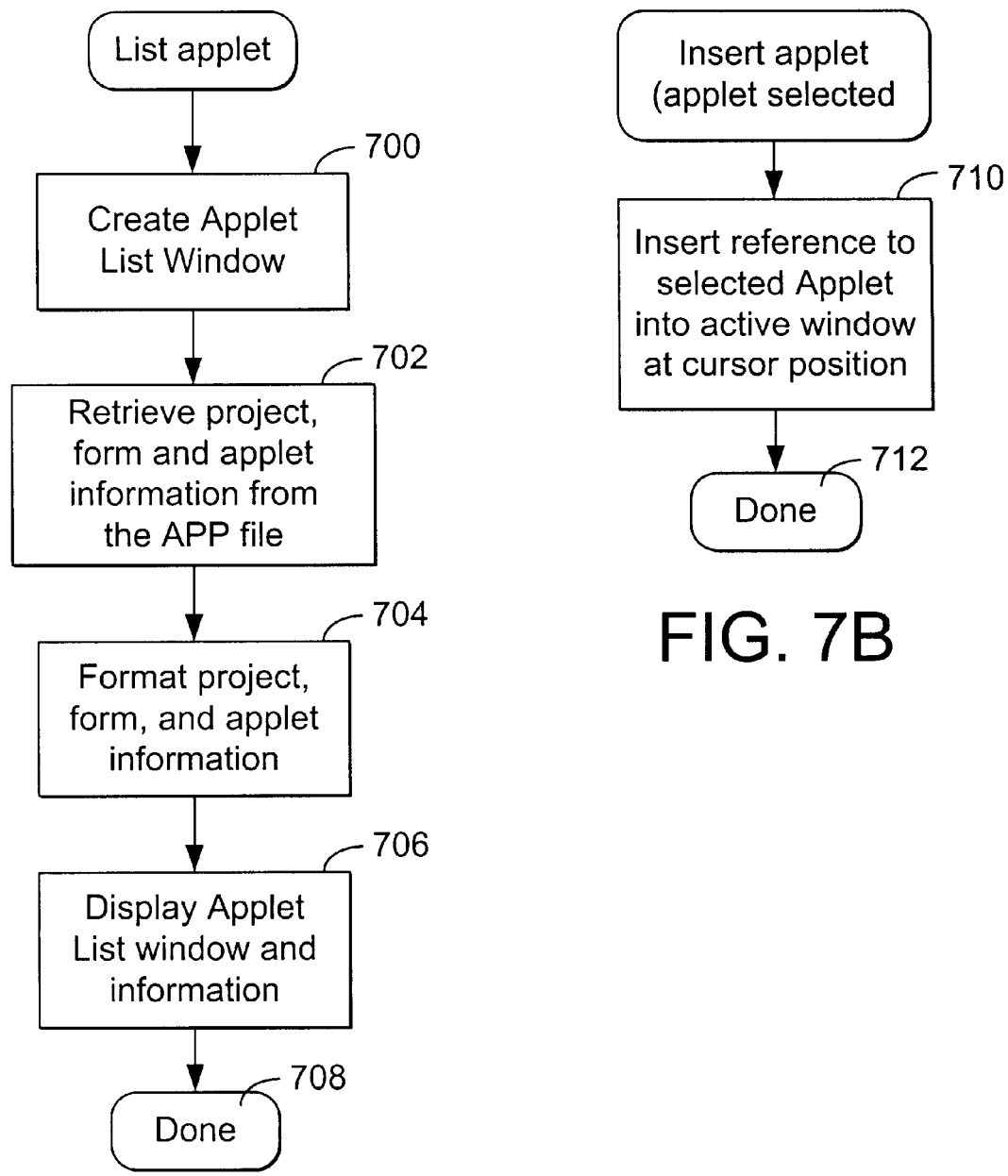

HTML INTEGRATION UTILITY FOR A PROGRAM DEVELOPMENT ENVIRONMENT

CROSS-REFERENCE TO RELATED APPLICATIONS

This is a continuation of application Ser. No. 08/828,890, filed Mar. 31, 1997 Now U.S. Pat.No. 5,953,731.

This application is related to the following co-pending and commonly-assigned patent applications:

application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on same date herewith, by Daniel E. House, Brian J. Owings, and Shiau-Shiau Pei;

application Ser. No. 08/828,476, entitled "SHARED OBJECT MODEL," filed on same date herewith, by Brian J. Owings, Shiau-Shiau Pei, and Daniel E. House;

application Ser. No. 08/828,480, entitled "REMOTE SCRIPTING OF LOCAL OBJECTS," filed on same date herewith, by Daniel E. House, Constance J. Nelin, and Rebecca B. Nin;

application Ser. No. 08/828,989, entitled "METHOD AND APPARATUS FOR SIMULATING A MULTI-TIERED COMPUTER ENVIRONMENT," filed on same date herewith, by Daniel E. House and Constance J. Nelin;

application Ser. No. 08/828,478, entitled "MULTI-TIER VIEW PROJECT WINDOW," filed on same date herewith, by Howard J. Glaser, Daniel E. House, and Constance J. Nelin;

application Ser. No. 08/828,104, entitled "EXTENDER USER INTERFACE," filed on same date herewith, by Thomas E. Conrad, Howard J. Glaser, Jean C. Ho, James L. Keesey, Constance J. Nelin, and Gerold J. Wilmot;

application Ser. No. 08/828,846, entitled "SHARED MODULES GRAPHICAL USER INTERFACE," filed on same date herewith, by Howard J. Glaser, Daniel E. House, and Constance J. Nelin;

application Ser. No. 08/828,479, entitled "QUERY SELECTION FOR A PROGRAM DEVELOPMENT ENVIRONMENT," filed on same date herewith, by Howard J. Glaser and Mary C. Lehner;

application Ser. No. 08/828/477, entitled "DOCKING AND FLOATING MENU/TOOL BAR," filed on same date herewith, by Howard J. Glaser, Stewart E. Nickolas, and Karl D. Johnson;

application Ser. No. 08/828,762, entitled "EXTENDER SMART GUIDE," filed on same date herewith, by Howard J. Glaser;

application Ser. No. 08/828,481, entitled "MULTI-TIER DEBUGGING," filed on same date herewith, by Daniel E. House and Constance J. Nelin; and application Ser. No. 08/828,940, entitled "DYNAMIC DISCOVERY OF CONTROLS," filed on same date herewith, by Daniel E. House and Constance J. Nelin; all of which applications are incorporated by reference herein.

BACKGROUND OF THE INVENTION

1. Field of the Invention

This invention relates in general to programming development environments performed by computers, and in particular, to the use of a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications. A utility allows visual selection and/or manipulation of HTML pages or forms. A user may select control from one form or HTML page and insert it into another HTML page. This results in the applet code associated with the selected control being inserted into the code for the HTML page being displayed in a code editor window or form editor window. The development computer also performs a dependency check for other codes and/or controls upon which the inserted applet depends and issues warnings or performs automatic inclusion of the dependency code and/or control.

BRIEF DESCRIPTION OF THE DRAWINGS

Referring now to the drawings in which like reference numbers represent corresponding parts throughout:

FIGS. 7A and 7B are flow charts that illustrate the general logic that implements the "list applet" and "insert applet (applet selected)" functions that provide an end result similar to the "drag and drop" operation described in conjunction with FIGS. 6A–6D;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
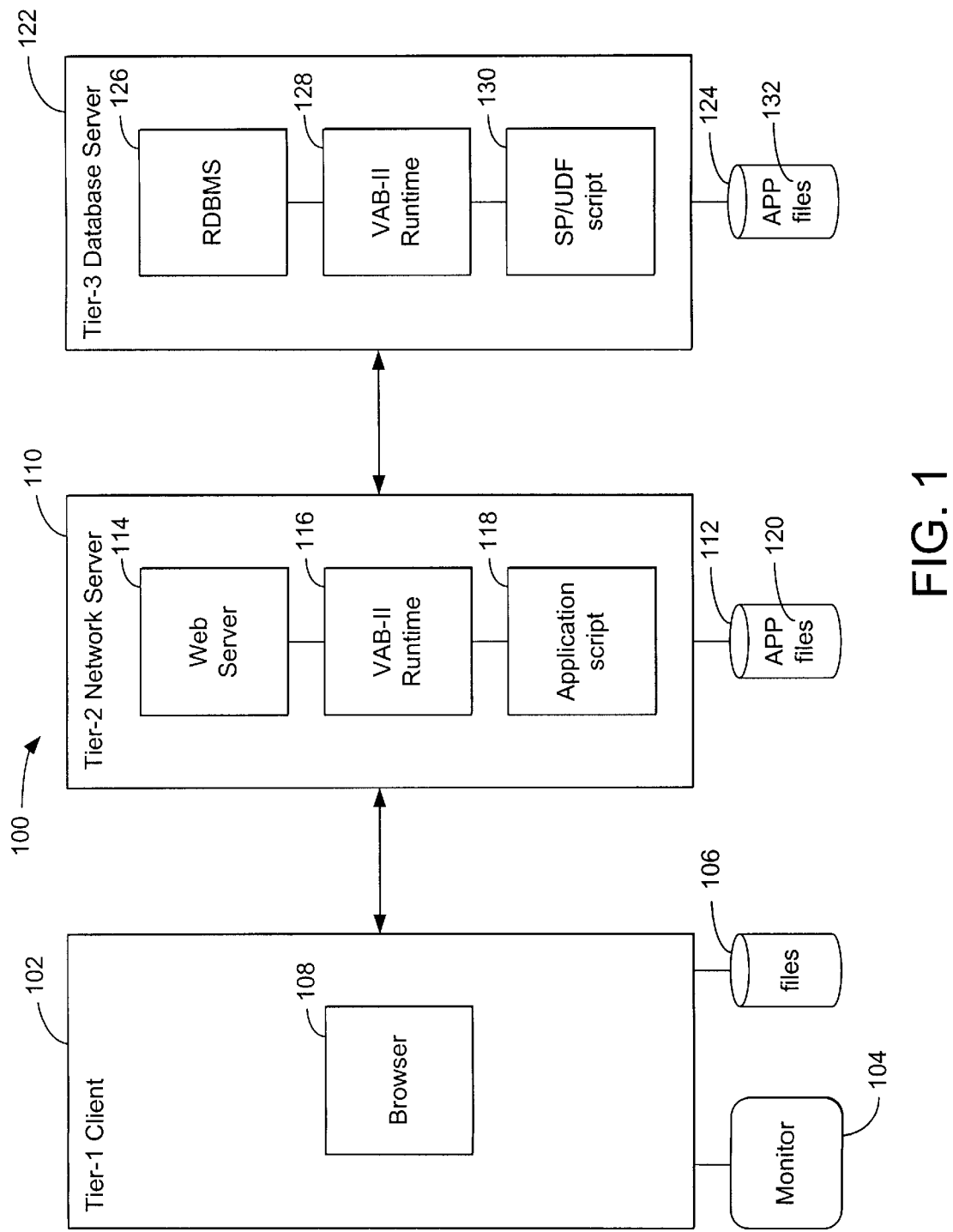
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

Figure 2:
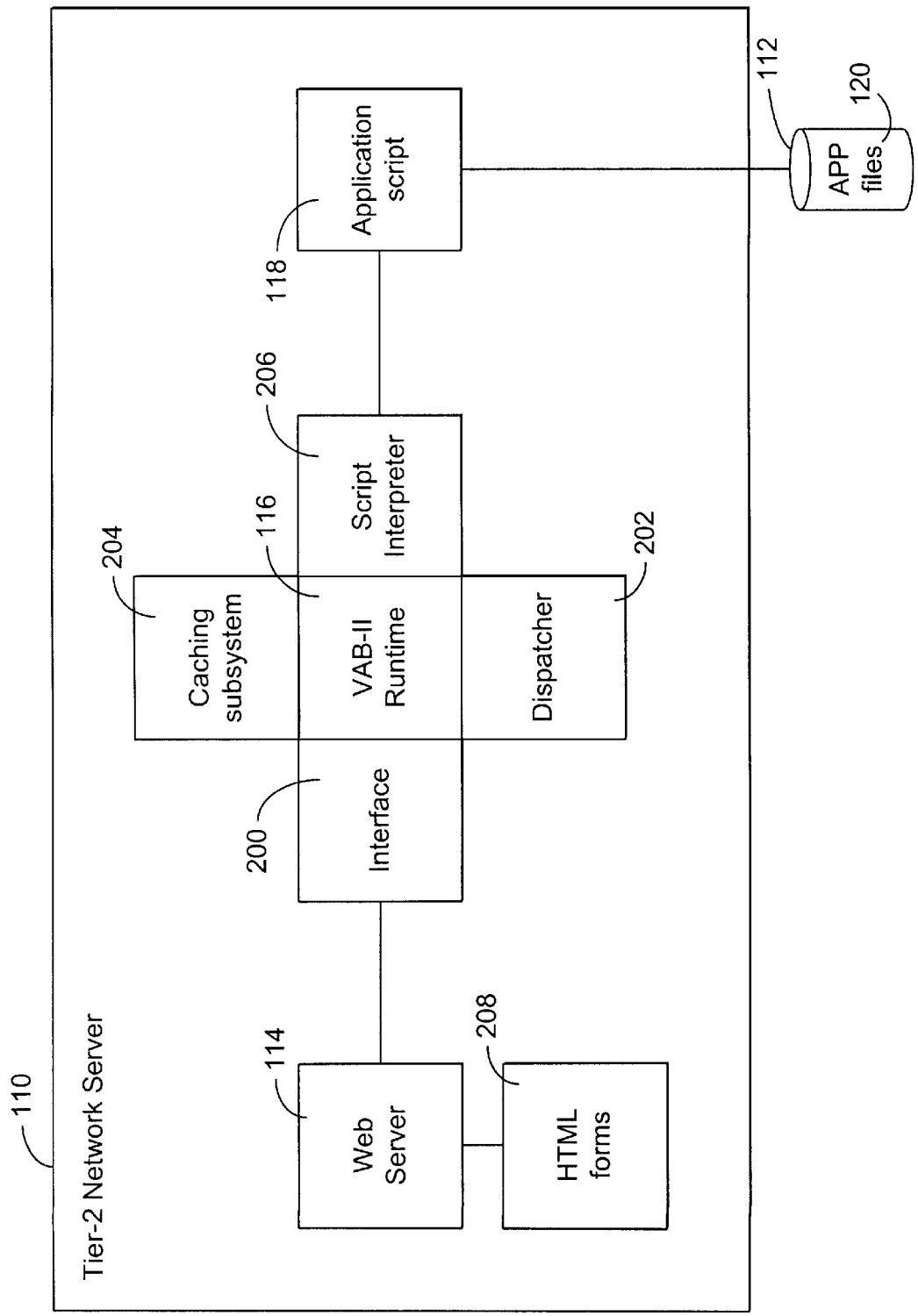
FIG. 2 is a block diagram that further illustrates the components of the network server in the present invention.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs. FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
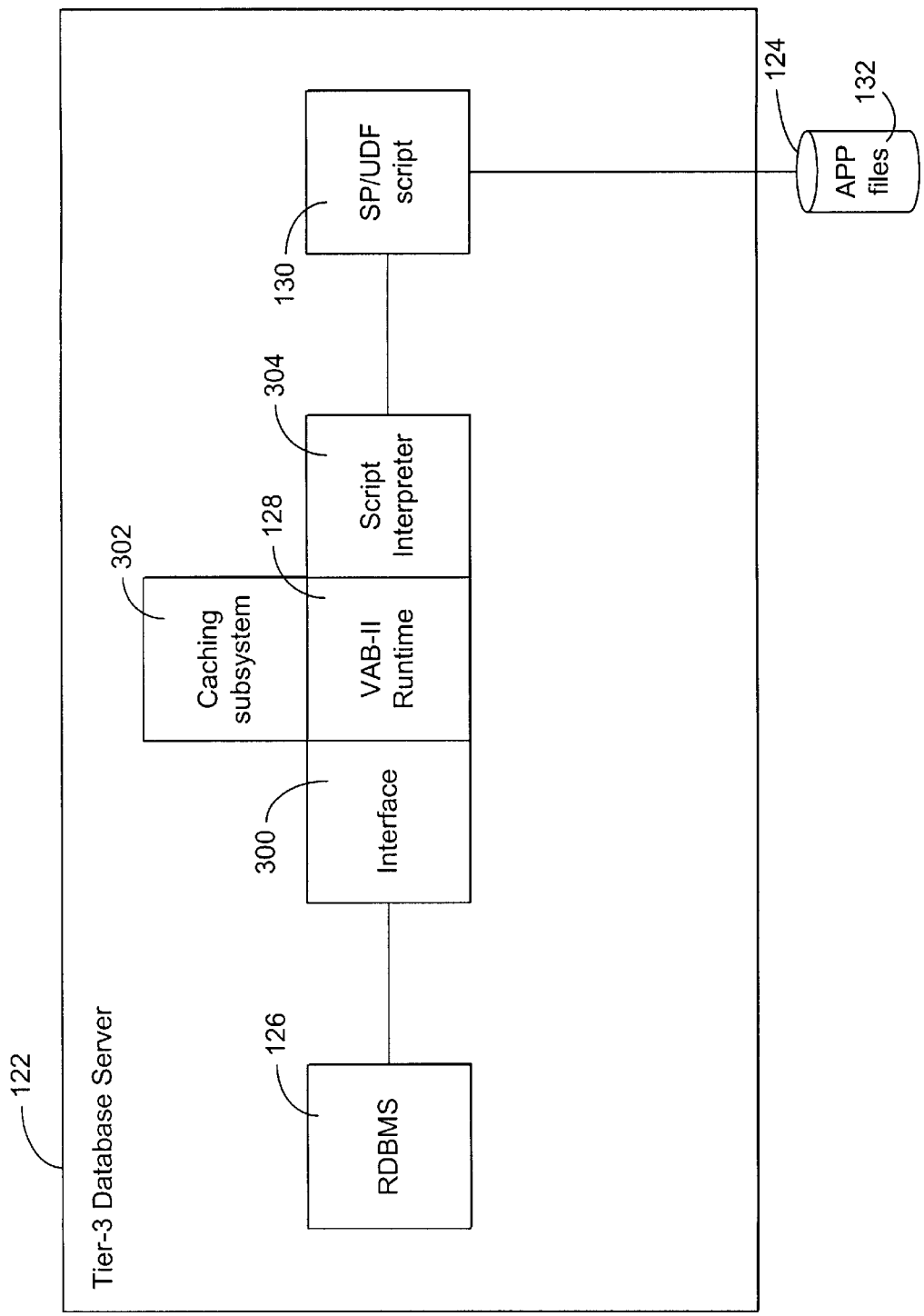
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
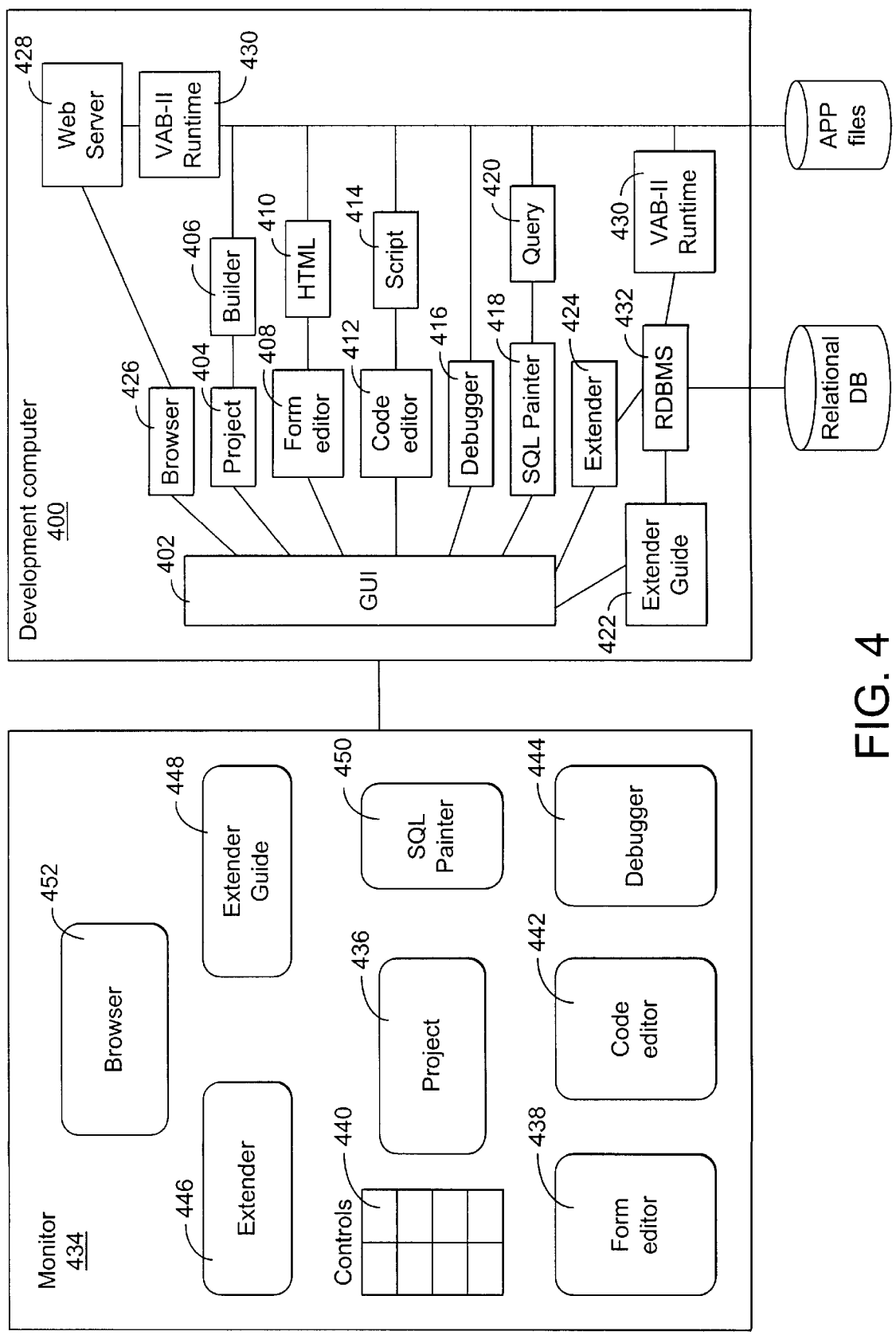
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

HTML Integration Utility

The present invention discloses an HTML integration utility that allows visual selection and/or manipulation of HTML pages or forms. A user may drag and drop a selected control (e.g., a button) from one form or HTML page and onto another HTML page. On the development computer 400, this results in the applet code associated with the selected control being inserted into the code displayed in the code editor window or form editor window. The development computer 400 also performs a dependency check for other codes and/or controls upon which the inserted applet depends and issues warnings or performs automatic inclusion of the dependency code and/or control.

Figures 5, 6A:
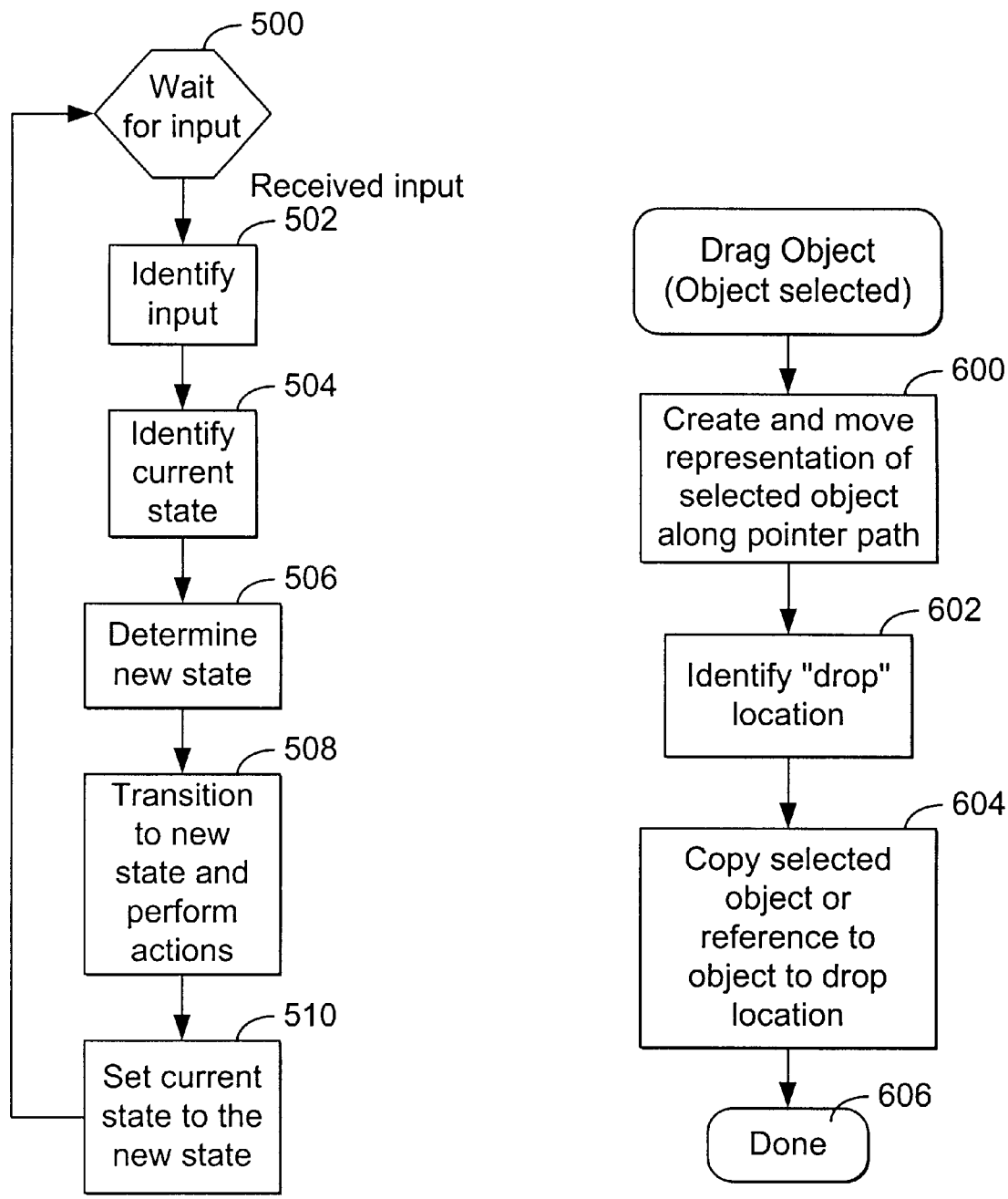
FIG. 5 is a flow chart that illustrates the general logic of the development computer in performing the steps of the present invention, and more specifically, in performing the steps necessary for handling the user interface for the development computer.
FIG. 6A is a flow chart that illustrates the general logic that implements the "drag object (object selected)"function of a "drag and drop" operation.

FIG. 5 is a flow chart that illustrates the general logic of the development computer 400 in performing the steps of the present invention, and more specifically, in performing the steps necessary for handling the user interface for the development computer 400. In the development computer, operations are performed when transitions are made, based upon input events, from present or current states to new states.

Block 500 represents the development computer 400 waiting for an input event (e.g., a mouse button click). It should be appreciated that during this time, other system tasks, e.g., file, memory, and video tasks, etc., may also be carried out. When an input event occurs, control passes to block 502 to identify the input event. Based upon the input event, as well as the current state of the development computer 400 determined in block 504, a new state is determined in block 506. In-block 508, a transition is made to the new state and performs any actions required for the transition. In block 510, the current state is set to the previously determined new state, and control returns to block 500 to wait for more input events.

The specific operations that are performed by block 508 when transitioning between states will vary depending upon the current state and the input event. The various operations required to implement the present invention represent particular events handled by the development computer 400. However, it should be appreciated that these events represent merely a subset of all of the events handled by the development computer 400.

Flowcharts which illustrate various operations that may be performed by the development computer as part of the present invention are shown in FIGS. 6A, 7A, 7B, 8A, and 8B. In each of these flowcharts, the header blocks thereof indicate the particular input event with the current state denoted in parentheses. In addition, corresponding diagrams, i.e., FIGS. 6B, 6C, 6D, 7C, 8C, and 8D, are provided to illustrate the operation of their respective flowcharts.

Drag and Drop

Figure 6B:
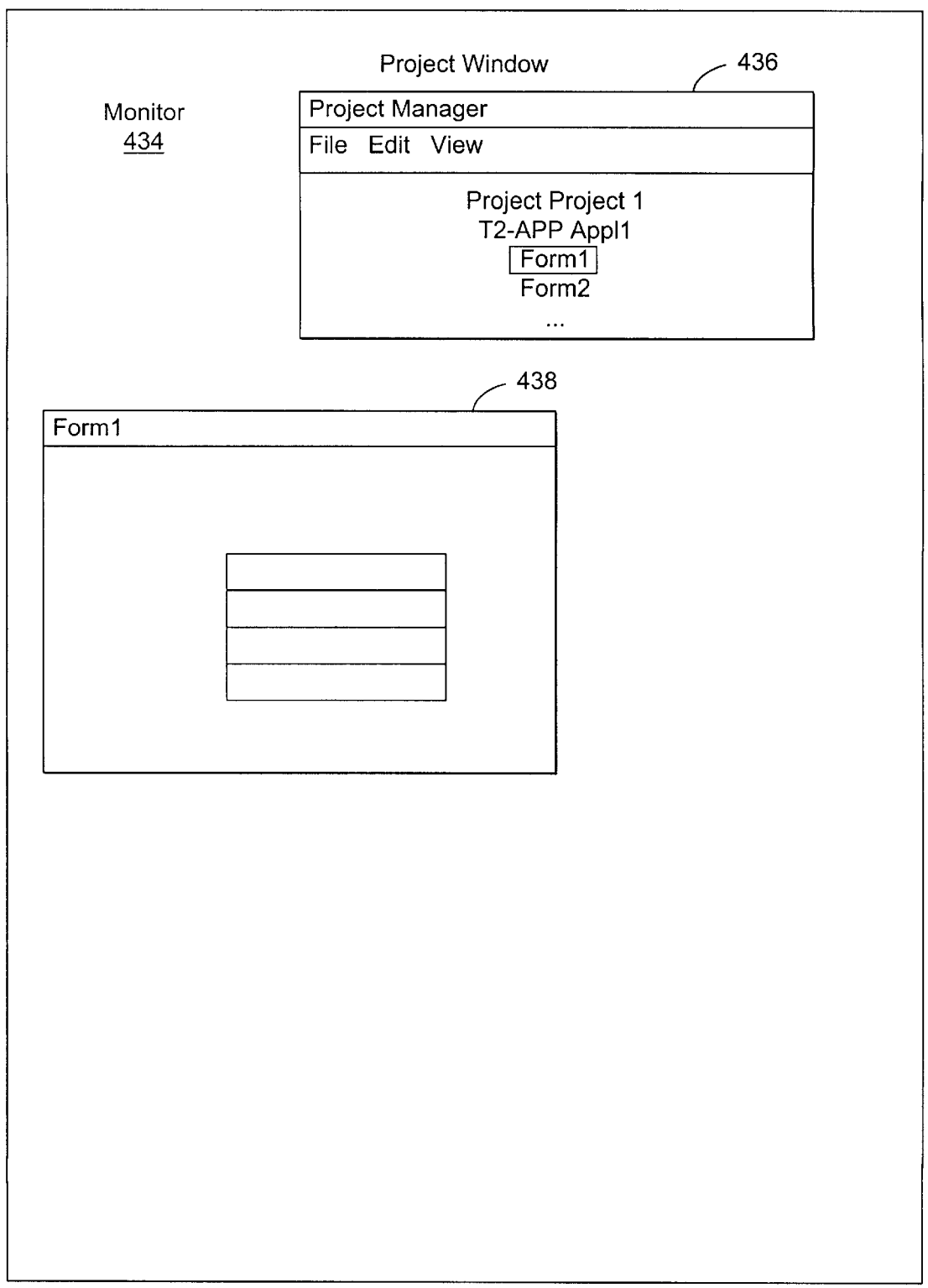
FIGS. 6B, 6C, and 6D are block diagrams of a computer generated display illustrating the operation of the routine of FIG. 6A.
Figure 6C:
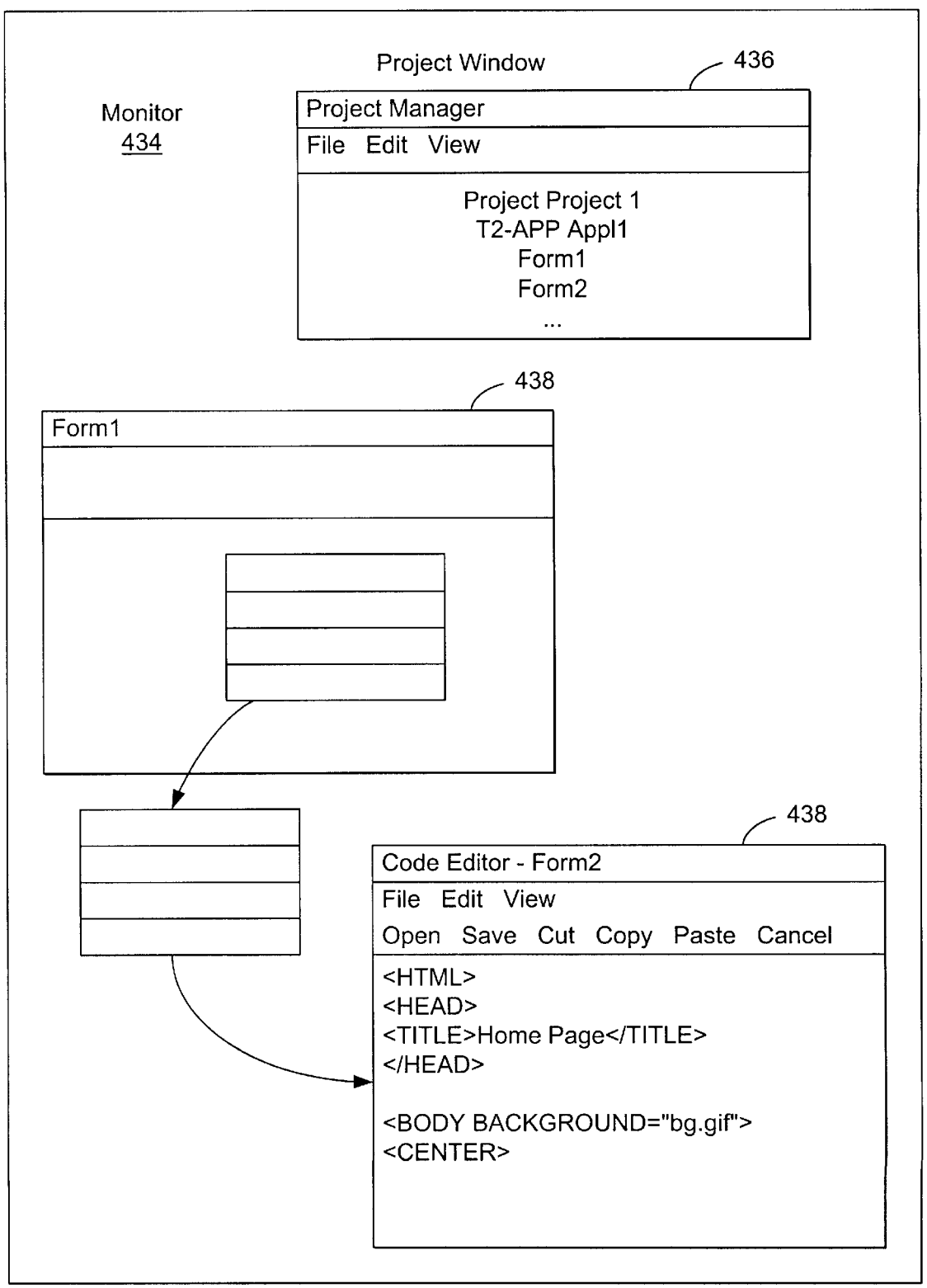
Figure 6D:
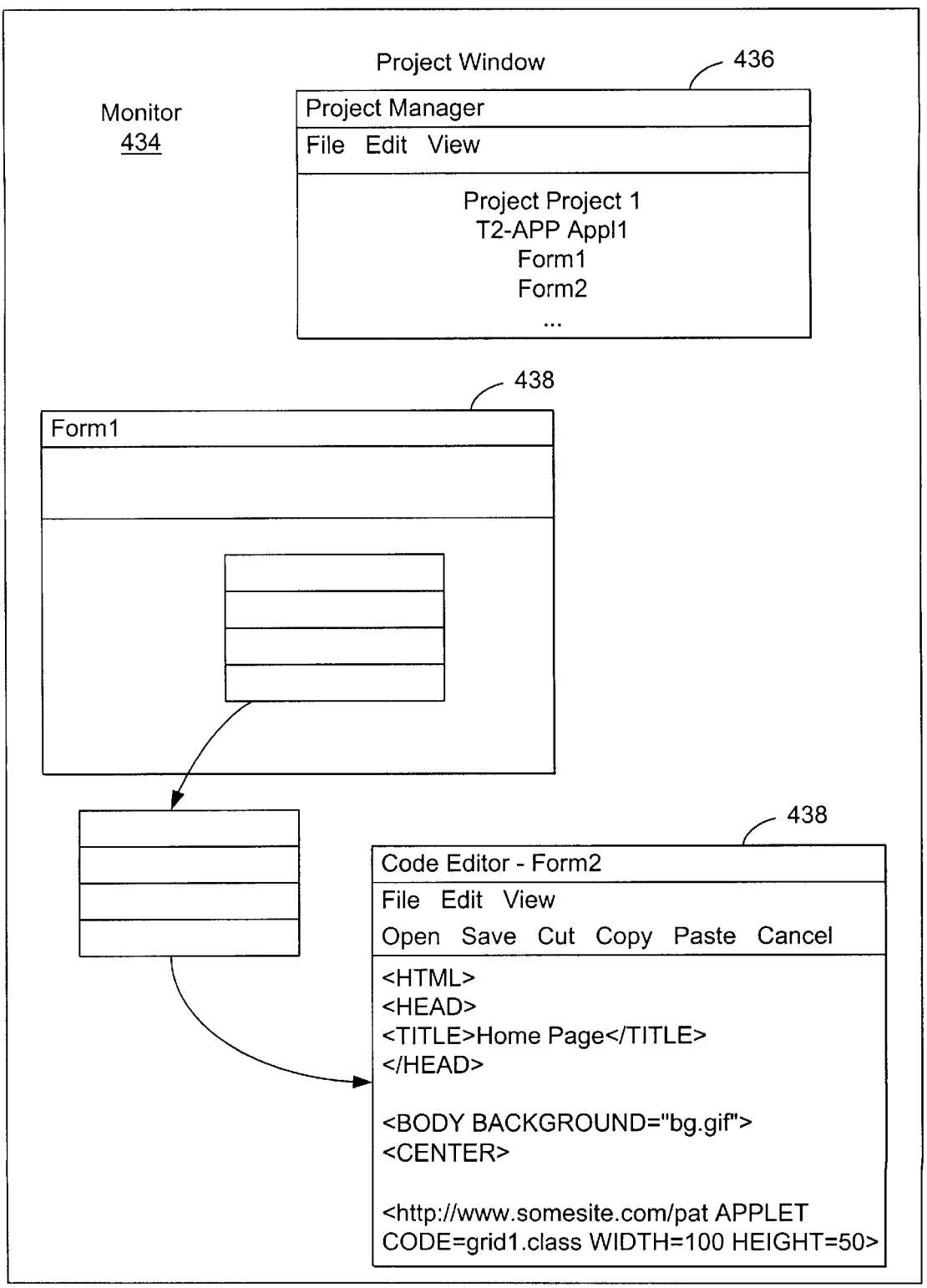

FIG. 6A is a flow chart that illustrates the general logic that implements the "drag object (object selected)"function of a "drag and drop" operation. FIGS. 6B, 6C, and 6D are block diagrams of a computer generated display illustrating the operation of the routine of FIG. 6A, wherein FIG. 6B illustrates the form editor and form window displaying FORM1 that includes a grid, FIG. 6C illustrates the grid being dragged from FORM1 to the code editor window displaying the HTML for FORM2 (by selecting the grid, holding down the right mouse button, and dragging the mouse cursor as indicated by the arrows), and FIG. 6D illustrates the present invention inserting an HTML reference to the object (e.g., "<http://www.somesite.com/path/ APPLET CODE=grid1.class WIDTH=100 HEIGHT=50>") into FORM2 within the code editor window (by positioning the mouse cursor in the desired location of FORM2 and releasing the right mouse button).

In the preferred embodiment, the logic is executed whenever a "drag object (object selected)" event occurs in the development computer 400. The event may occur in response to various user inputs, e.g., by various mouse/ keyboard combinations to invoke the function.

Block 600 represents the development computer 400 creating and moving a representation of the selected object from FORM1 along the mouse pointer path, as indicated in FIG. 6C. The representation may be a copy of the object itself or another graphical representation, such as a thumbnail or icon.

Block 602 represents the development computer 400 identifying the "drop" location for the drag and drop operation. This location is identified by the position of the mouse pointer when the right mouse button is released. In FIGS. 6B and 6C, this is indicated by position of the arrow within FORM2.

Block 604 represents the development computer 400 copying the selected object or a reference to the selected object to the drop location, as indicated in FIG. 6D. In this example, the present invention inserts an HTML reference to the object (e.g., "<http://www.somesite.com/path/ APPLET CODE=grid1.class WIDTH=100 HEIGHT=50>") into FORM2 within the code editor window.

Finally, Block 606 represents the termination of the logic.

Applet List

Figure 7C:
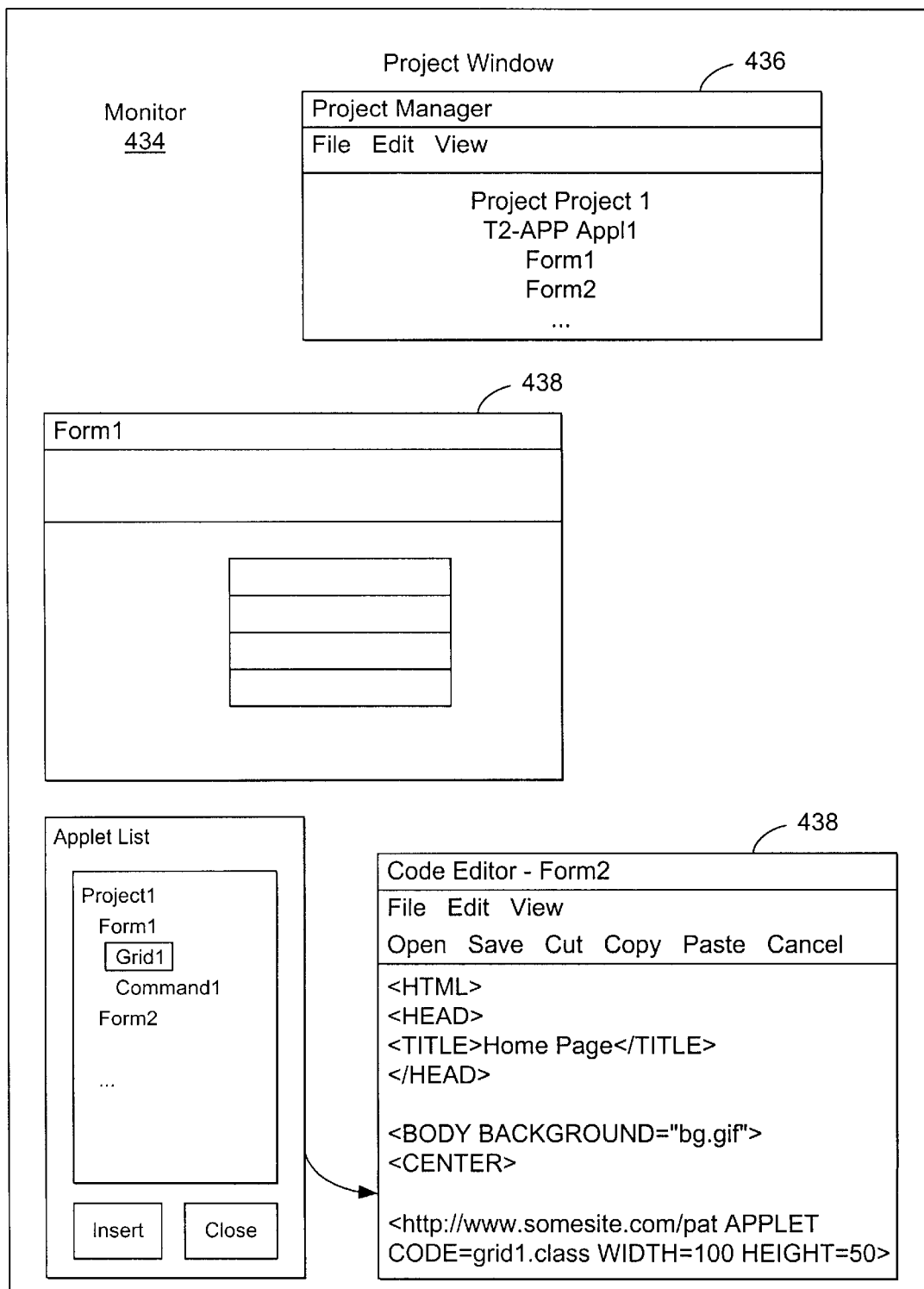
FIG. 7C is a block diagram of a computer generated display illustrating the operation of the routines of FIG. 7A and 7B.

FIGS. 7A and 7B are flow charts that illustrate the general logic that implements the "list applet" and "insert applet (applet selected)" functions that provide an end result similar to the "drag and drop" operation described in conjunction with FIGS. 6A–6D. FIG. 7C is a block diagram of a computer generated display illustrating the operation of the routines of FIG. 7A and 7B, wherein FIG. 7C illustrates the Applet List window displaying applets for all forms and projects known to the development computer, selecting "grid1" from the Applet List window, and then inserting an HTML reference to the applet (e.g., "<http:// www.somesite.com/path/ APPLET CODE=grid1.class WIDTH=100 HEIGHT=50>") into FORM2 within the code editor window (by positioning the cursor in the desired location of FORM2 and pressing the "Insert" button of the Applet List window).

In the preferred embodiment, the logic of FIG. 7A is executed whenever a "list applet" event occurs in the development computer and the logic of FIG. 7B is executed whenever an "insert applet (applet selected)" event occurs in the development computer 400. These events may occur in response to various user inputs, e.g., by various mouse/ keyboard combinations to invoke the function.

Referring initially to FIG. 7A, Block 700 represents the development computer 400 creating an applet list window. The applet list window includes typical user interface mechanisms such as a title bar, a border, scroll bars, a minimize button, a maximize button, and a close button. A contents area is defined within the applet list window.

Block 702 represents the development computer 400 retrieving the project, form, and applet information (if any) from APP files stored in a data storage device connected (either locally or remotely) to the development computer 400.

Block 704 represents the development computer 400 formatting the retrieved project, form, and applet information (if any) for display within the contents area of the applet list window; otherwise, the contents area is blank.

Block 706 represents the development computer 400 displaying the form window and the formatted form information (if any) on a monitor, as shown in FIG. 7C. Opening or creation of the applet list window is then complete.

Finally, Block 708 represents the termination of the logic.

Referring next to FIG. 7B, Block 710 represents the development computer 400 inserting a reference to the selected applet into the active window at the current cursor position, as indicated in FIG. 7C. In this example, the present invention inserts an HTML reference to the applet (e.g., "<http://www.somesite.com/path/ APPLET CODE= grid1.class WIDTH=100 HEIGHT=50>") into FORM2 within the code editor window.

Finally, Block 712 represents the termination of the logic.

Copy/Cut and Paste

Figures 8A, 8B:
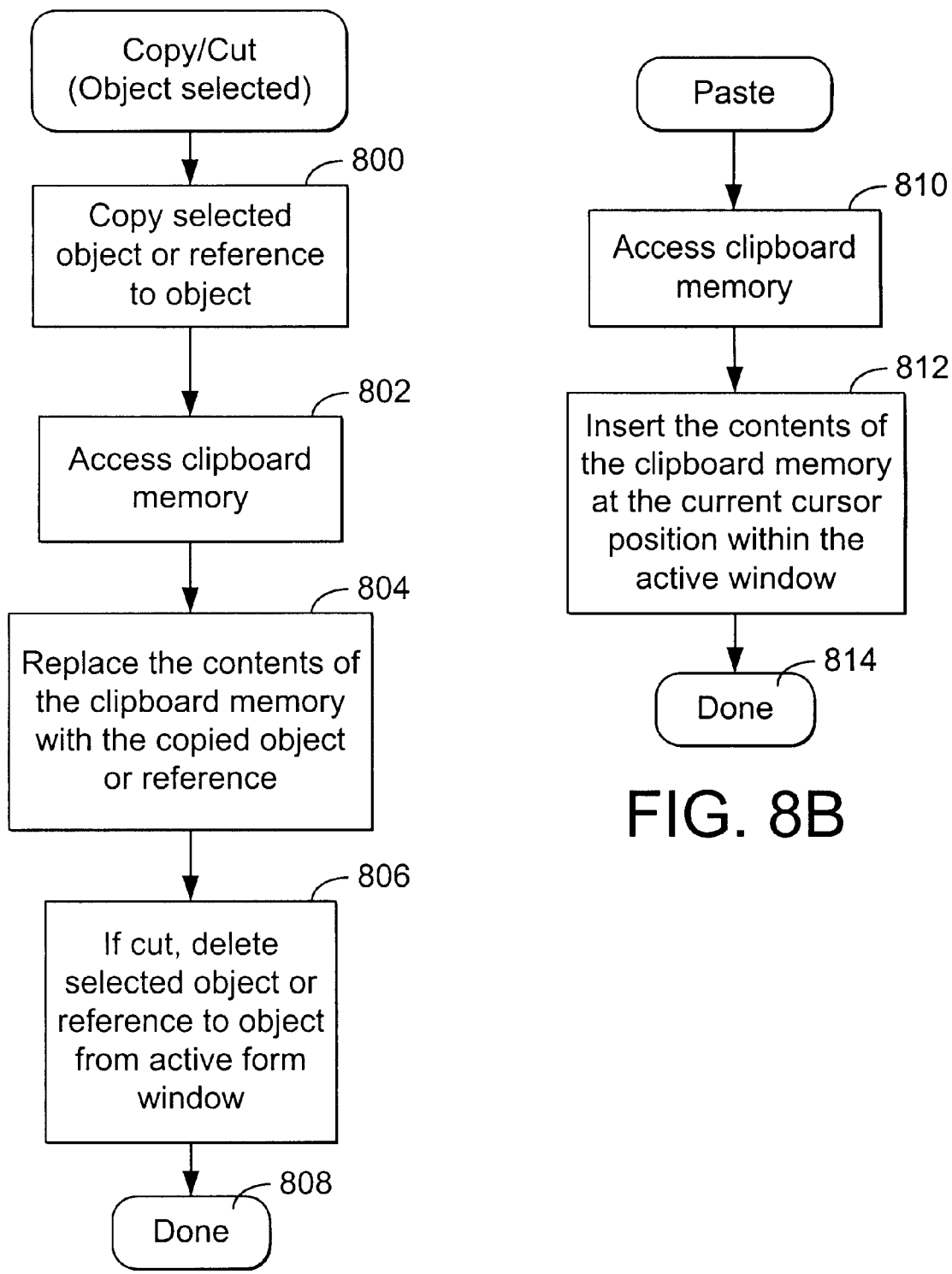
FIGS. 8A and 8B are flow charts that illustrate the general logic that implements the "copy/cut (object selected)" and "paste" functions that provide an end result similar to the "drag and drop" operation described in conjunction with FIGS. 6A–6D and the "applet list" operation described in conjunction with FIGS. 7A–7C.
Figure 8C:
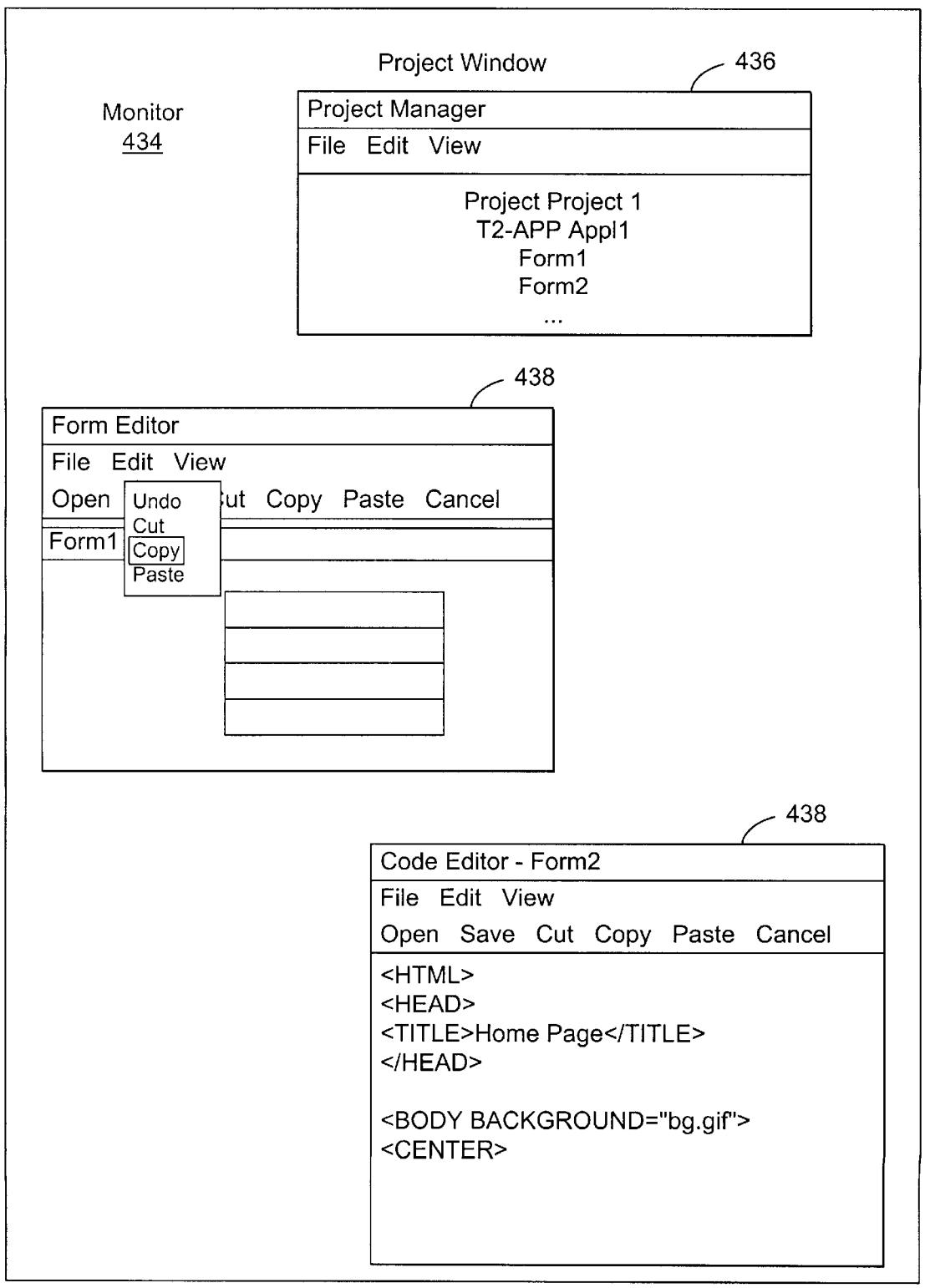
FIGS. 8C and 8D are block diagrams of a computer generated display illustrating the operation of the routines of FIGS. 8A and 8B.
Figure 8D:
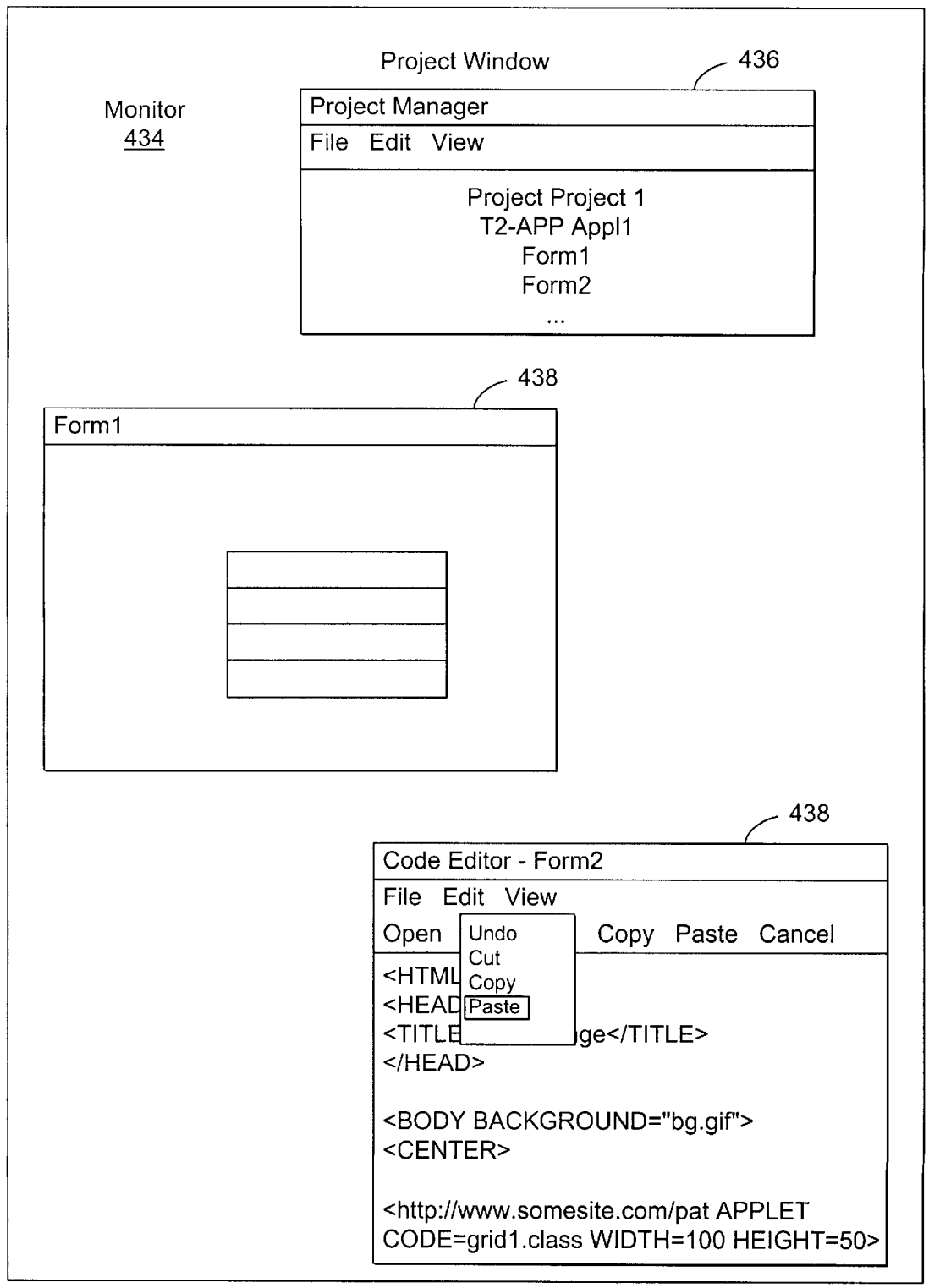

FIGS. 8A and 8B are flow charts that illustrate the general logic that implements the "copy/cut (object selected)" and "paste" functions that provide an end result similar to the "drag and drop" operation described in conjunction with FIGS. 6A–6D and the "applet list" operation described in conjunction with FIGS. 7A–7C. FIGS. 8C and 8D are block diagrams of a computer generated display illustrating the operation of the routines of FIGS. 8A and 8B, wherein FIG. 8C illustrates the "Edit" menu being used to copy a selected object from FORM1 to a clipboard and FIG. 8D illustrates the "Edit" menu being used to paste the copied object from the clipboard to FORM2.

In the preferred embodiment, the logic of FIG. 8A is executed whenever a "copy/cut (object selected)" event occurs in the development computer 400 and the logic of FIG. 8B is executed whenever a "paste" event occurs in the development computer 400. These events may occur in response to various user inputs, e.g., by various mouse/ keyboard combinations to invoke the function.

Referring initially to FIG. 8A, Block 800 represents the development computer 400 copying the selected object or a reference to the selected object into its memory.

Block 802 represents the development computer 400 accessing the clipboard memory used with the "edit"functions.

Block 804 represents the development computer 400 replacing the contents of the clipboard memory (if any) with the copied object or the copied reference to the object.

If the operation was a "cut" operation, then Block 806 represents the development computer 400 cutting or removing the selected object or the reference to the object from FORM1.

Finally, Block 808 represents the termination of the logic.

Referring next to FIG. 8B, Block 810 represents the development computer 400 accessing the copied object or the copied reference to the object from the clipboard memory.

Block 812 represents the development computer 400 pasting or inserting the copied object or the copied reference to the object into the active window at the current cursor position, as indicated in FIG. 8D. In this example, the present invention inserts an HTML reference to the object (e.g., "http://www.somesite.com/path/ APPLET CODE= grid1.class WIDTH=100 HEIGHT=50>") into FORM2 within the code editor window.

Finally, Block 814 represents the termination of the logic.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications. A utility allows visual selection and/or manipulation of HTML pages or forms. A user may select control from one form or HTML page and insert it into another HTML page. This results in the applet code associated with the selected control being inserted into the code for the HTML page being displayed in the code editor window or form editor window. The development computer also performs a dependency check for other codes and/or controls upon which the inserted applet depends and issues warnings or performs automatic inclusion of the dependency code and/or control.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of developing forms in a computer, comprising the steps of:
   (a) displaying a first form on a monitor attached to the computer;
   (b) selecting one or more objects from fie first form and inserting a reference for each of the selected objects into a second form displayed on the monitor, wherein the object comprises an applet; and
   (c) for each selected object, performing a dependency check for other code and controls upon which the selected object is dependent.

2. The method of claim 1 above, wherein the first form comprises a HyperText Markup Language (HTML) page.

3. The method of claim 2 above, wherein the second form comprises a HyperText Markup Language (HTML) page.

4. The method of claim 3 above, wherein the reference comprises an HTML tag identifying the applet.

5. The method of claim 1, wherein the selecting step further comprises the steps of:
   selecting an object from the first form using a copy command;
   dragging the object from the first form to the second form using the pointing device;
   dropping the dragged object onto the second form using a paste command; and
   inserting a reference to the dropped object into the second form at a position indicated by the pointing device.

6. The method of claim 1, wherein the selecting step further comprises the steps of:
   displaying an applet list window;
   selecting one or more object within the applet list window; and
   inserting a reference for each of the selected objects into the second form.

7. An apparatus for developing forms, comprising:
   (a) a computer having a monitor connected thereto;
   (b) means, performed by the computer, for displaying a first form on the monitor connected to the computer;
   (c) means, performed by the computer, for selecting one or more objects from the first form and inserting a reference for each of the selected objects into a second form, wherein the object comprises an applet; and
   (d) for each selected object, means, performed by the computer, for performing a dependency check for other code and controls upon which the selected object is dependent.

8. The apparatus of claim 7 above, wherein the first form comprises a HyperText Markup Language (HTML) page.

9. The apparatus of claim 8 above, wherein the second form comprises a HyperText Markup Language (HTML) page.

10. The apparatus of claim 9 above, wherein the reference comprises an HTML tag identifying the applet.

11. The apparatus of claim 7, wherein the selecting means further comprises:
    means, performed by the computer, for selecting an object from the first form using a copy command;
    means, performed by the computer, for dragging the object from the first form to the second form using the pointing device;
    means, performed by the computer, for dropping the dragged object onto the second form using a paste command; and
    means, performed by the computer, for inserting a reference to the dropped object into the second form at a position indicated by the pointing device.

12. The apparatus of claim 7, wherein the selecting means further comprises:
    means, performed by the computer, for displaying an applet list window;
    means, performed by the computer, for selecting one or more objects within the applet list window; and
    means, performed by the computer, for inserting a reference for each of the selected objects into the second form.

13. An article of manufacture comprising a program storage medium readable by a computer and embodying one or more instructions executable by the computer to perform method steps for developing forms, the method comprising the steps of:
    (a) displaying a first form on a monitor attached to the computer; and
    (b) selecting one or more objects from the first form and inserting a reference for each of the selected objects into a second form, wherein the object comprises an applet; and
    (c) for each selected object, performing a dependency check for other code and controls upon which the selected object is dependent.

14. The article of manufacture of claim 13 above, wherein the first form comprises a HyperText Markup Language (HTML) page.

15. The article of manufacture of claim 14 above, wherein the second form comprises a HyperText Markup Language (HTML) page.

16. The article of manufacture of claim 15 above, wherein the reference comprises an HTML tag identifying the applet.

17. The article of manufacture of claim 13, wherein the selecting step further comprises the steps of:

selecting an object from the first form using a copy command;

dragging the object from the first form to the second form using the pointing device;

dropping the dragged object onto the second form using a paste command; and inserting a reference to the dropped object into the second form at a position indicated by the pointing device.

18. The article of manufacture of claim 13, wherein the selecting step further comprises the steps of:

displaying an applet list window;

selecting one or more objects within the applet list window; and inserting a reference for each of the selected objects into the second form.

* * * * *

UNITED STATES PATENT AND TRADEMARK OFFICE
CERTIFICATE OF CORRECTION

PATENT NO.   : 6,446,097 B1
DATED        : September 3, 2002
INVENTOR(S)  : Howard Justin Glaser It is certified that error appears in the above-identified patent and that said Letters Patent is hereby corrected as shown below:

<u>Column 9,</u>
Line 48, "fie" should read -- the --

Signed and Sealed this

Twenty-second Day of April, 2003

JAMES E. ROGAN
*Director of the United States Patent and Trademark Office*